Jan. 27, 1970     M. C. SZE     3,492,099
PARALLEL GAS FLOW REACTOR
Filed Oct. 12, 1964     3 Sheets-Sheet 1

INVENTOR
Morgan C. Sze
BY
Flynn, Marn & Jangarathis
ATTORNEYS

INVENTOR
Morgan C. Sze
BY
Flynn, Marn & Jangarathis
ATTORNEYS

Jan. 27, 1970     M. C. SZE     3,492,099
PARALLEL GAS FLOW REACTOR

Filed Oct. 12, 1964     3 Sheets-Sheet 3

INVENTOR
Morgan C. Sze
BY
Flynn, Maxn & Jangarathis
ATTORNEYS

United States Patent Office 3,492,099
Patented Jan. 27, 1970

3,492,099
PARALLEL GAS FLOW REACTOR
Morgan C. Sze, Garden City, N.Y., assignor to The Lummus Company, New York, N.Y., a corporation of Delaware
Filed Oct. 12, 1964, Ser. No. 403,145
Int. Cl. B01j 9/04, 3/00; C01c 1/04
U.S. Cl. 23—289
10 Claims

ABSTRACT OF THE DISCLOSURE

An improved, high capacity ammonia synthesis convertor in which two or more catalyst baskets are stacked on top of a single heat exchanger. A dividing baffle on the shell side of the exchanger separates incoming gas into two, centrally located channels, each of which feeds a single catalyst basket thus defining a parallel flow of individual gas streams through the catalyst material. Gases pass through heat exchange tubes buried in their associated catalyst beds, through the beds, and thereafter are comingled to pass through the tube side of the heat exchanger. Quench gas can be supplied either in the heat exchanger or directly to the catalyst beds, and is subject to automatic control.

In the synthesis of amonnia, the combined hydrogen and nitrogen gases are compressed to an elevated pressure, heated to a suitable temperature ranging from 400° to 600° C. and passed over a suitable catalytic agent whereby a certain proportion of the combined gases is converted into ammonia. The pressure of the nitrogen-hydrogen gases in contact with the catalyst is constant, or at least as nearly so as possible.

Heretofore, a variety of reactor designs have enjoyed commercial success. Generally, these reactors comprise an outer shell of sufficient strength to stand the pressure and temperature conditions likely to be encountered during operation, an inner shell containing a catalyst bed or beds through which the reactant gases pass, and a heat exchanger for passing unreacted gases in indirect heat exchange relation with the hot, reacted gases. Also, the gases preheated in the heat exchanger may be passed through heat exchange tubes buried within the catalyst bed in order to maintain the necessary temperature for a good conversion rate within the catalyst bed.

In order to control the temperature within the catalyst bed, inlets for cold gas are generally provided which do not pass through the heat exchange portion but which can be admitted directly to the heat exchange tubes and/or the catalyst bed; in this manner, undesirable hot spots which will adversely affect conversion rate can be suitably controlled.

More recently, it has been the desire of workers in the art to build ammonia synthesis plants and the like of larger and larger capacity. Unfortunately, however, the hereinabove described type of reactor has definite upper size limits, as merely increasing the size of the shell, the full opening head and the components, i.e., heat exchanger and catalyst beds, is most uneconomic, and leads to operating difficulties. Such operating difficulties are those which are normal to the scale-up of chemical process reactors; for example, the gases tend to flow through preferred channels in the bed rather than evenly, resulting in uneven temperature distribution which makes accurate control almost impossible. On the economic side, capital costs increase greatly as diameter of a reactor is increased, and there is thus a need for a high capacity converter design which is no wider, essentially, than presently existing designs.

It is therefore a general object of the present invention to provide an improved catalytic reactor for carrying out high temperature exothermic reactions which is adaptable to high capacity operation with good operating control and construction economy.

A further object of the present invention is to provide an improved catalytic reactor for carrying out high temperature exothermic reactions wherein reactor diameter is maintained substantially at the same or is even narrower than in presently existing reactors, but in which production capacity is substantially increased.

Yet another object of the present invention is to provide an improved catalytic reactor for carrying out ammonia synthesis reactions and the like which is similar to presently existing reactors in terms of construction costs, ease of maintenance and repair, but which has a substantially higher capacity than presently existing reactors.

Various other objects and advantages of the present invention will be made clear during the course of the following description of an embodiment thereof, and the novel features will be particularly pointed out in connection with the appended claims.

Briefly, the present invention involves an arrangement of two or more catalyst baskets with one common heat exchanger, the baskets being stacked one above the other but operated in parallel. Each basket is provided with individual temperature control means. By employing the foregoing arrangement, a smaller diameter converter having somewhat longer length than has heretofore been employed can be used. Since the diameter is at least the same or preferably smaller than existing installations, the single heat exchanger will have a substantially higher gas velocity inside the tubes, and will thus be able to meet the requirements of the two baskets, without resorting to core rods or the like inside the tubes to increase gas velocity, as is often done in industry.

According to the invention, mixed reactant gases are supplied through the outer shell of the apparatus and pass down an annular passage between inner and outer shells and into the shell portion of a tube-and-shell type heat exchanger. The heat exchanger is provided with a dividing baffle which divides the incoming gases into two separate streams as they pass through the shell portion of the heat exchanger. Other baffles are provided in the conventional manner to insure a serpentine-like flow of the gases through the heat exchanger. Communicating with the top of the shell portion of the heat exchanger are two separate gas passageways or conduits, each supplying a plenum chamber below one of the catalyst baskets. Each plenum chamber, in turn, supplies heat exchange tubes buried within the catalyst bed. Gases in the plenum chamber pass up through the heat exchange tubes and out the top thereof, into the space just above the catalyst beds, and thence downwardly through the catalyst beds for reaction therewith and out to the bottom thereof. From the bottom of the catalyst beds, the reacted gases pass through annular passages between the inner shell and the various reactor components and into a header which is connected to the tube side of the heat exchanger. A chamber at the bottom of the heat exchanger receives effluent reacted gases from the tube side of the heat exchanger and from there the gases are conveyed out of the reactor. By-pass conduits for supplying cold gas to the heated gas streams issuing from the heat exchanger are provided. The valves controlling this by-pass gas are operated by a control circuit responsive to a plurality of thermocouples buried in each of the catalyst beds. Thus, each catalyst bed may be controlled at the optimum working temperature. This applies especially to the "hot spot" temperature, which is the term used by those skilled in the art to designate the highest point in the temperature profile of a catalyst bed.

It is believed that a more detailed understanding of the apparatus of the invention will be gained by referring to the following detailed description thereof, taken in conjunction with the attached drawings, wherein.

It will be understood that the drawings are illustrative only and are not to be considered in a limiting sense.

Figure 1:
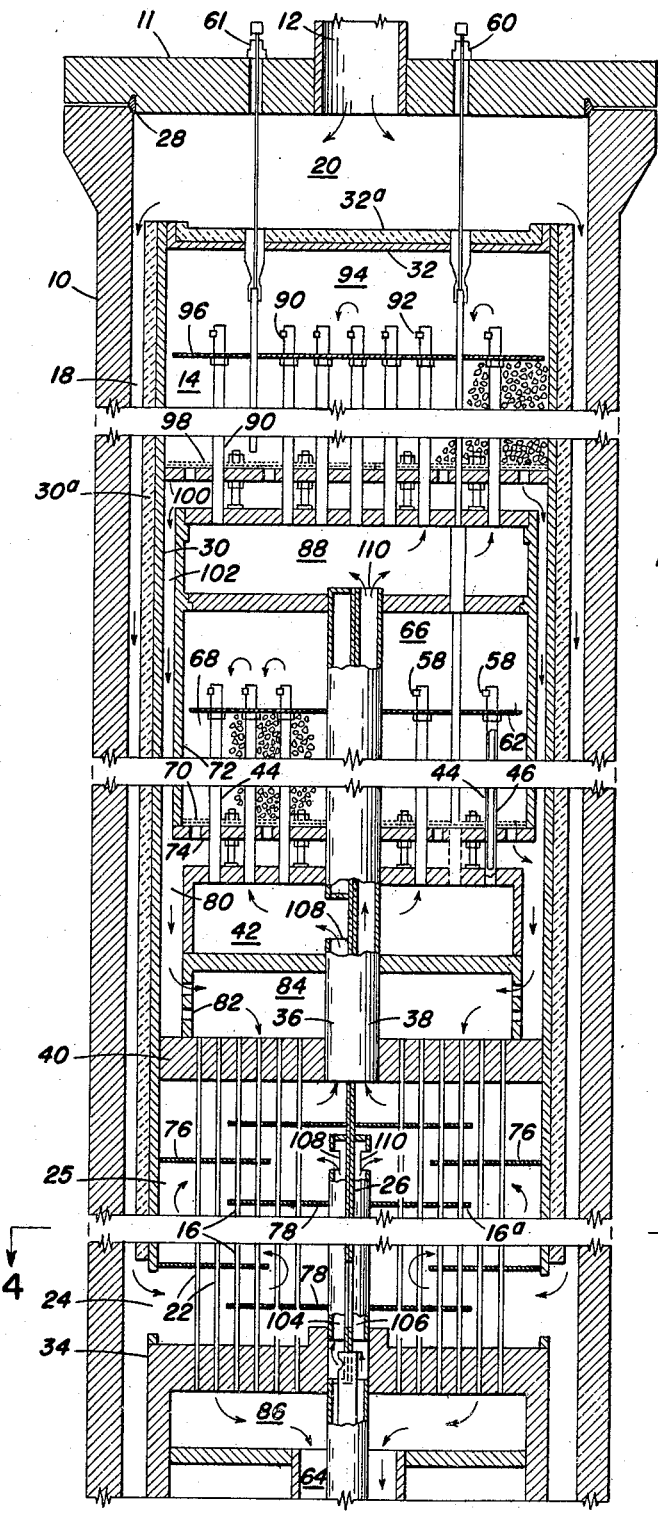
FIGURE 1 is a vertical cross section of a converter according to the invention.

With reference to FIGURE 1, the reactor is provided with an outer shell 10 closed at the top with a suitable closure piece 11 sealed to the reactor shell 10 by any suitable closing means 28 adapted for operation at the design pressure. A gas inlet 12 in closure piece 11 and a gas outlet 64 located at the bottom of outer shell 10 provide for entrance and egress of reactants and reaction products.

Catalyst beds and the heat exchanger are located within an inner shell 30 which is slightly smaller in diameter than outer shell 10, leaving an annular passage 18 therearound. The top of inner shell 30 is closed with member 32, and the bottom rests on effluent chamber 86. Inner shell 30 is provided with insulation 30a and 32a on the sides and top thereof. Suitable means (not shown) are provided for centering the inner shell 30 within outer shell 10. The heat exchanger and lower catalyst basket rest on the bottom of outer shell 10, due to their weight.

Figure 4:
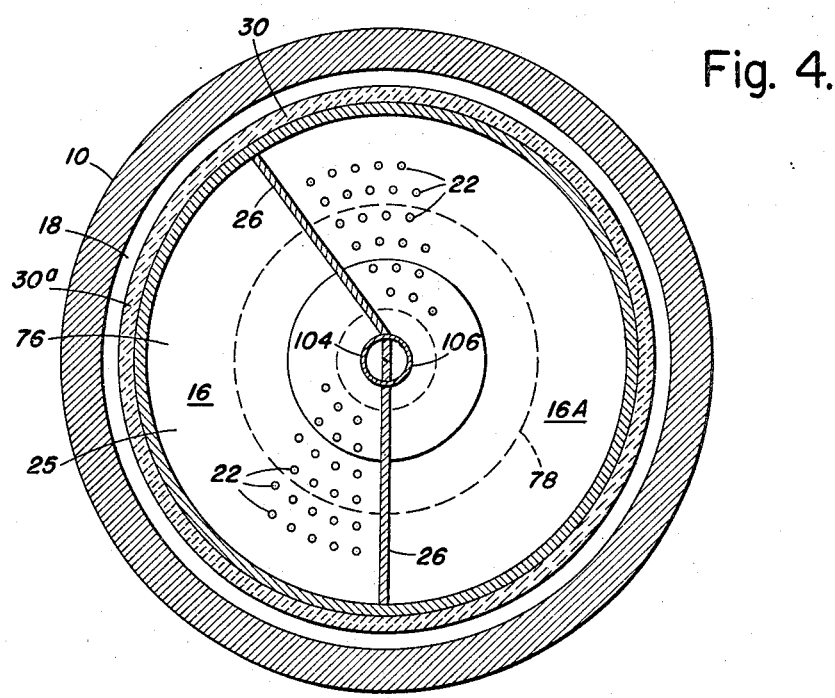
FIGURE 4 is a horizontal cross section taken along line 4—4 of FIGURE 1, showing an alternative embodiment of the invention.

The heat exchanger, indicated generally at 25, is located at the bottom of the reactor and is of the shell-and-tube type. Circular opening 24 in the bottom of shell 30 provides access to the shell side of the exchanger to the incoming gases. A vertical dividing baffle 26 divides the upper portion of the shell side of the exchanger into two chambers 16 and 16A. Dividing baffle 26 may be straight, as shown in FIGURE 1, or angled, as shown in FIGURE 4 and discussed hereinbelow. The principle involved is to proportion the number of heat exchange tubes and heat exchange surface to the gas flow in each catalyst bed. Horizontal donut baffles 76 and disc baffles 78 are spaced throughout the exchanger to direct gas flow and increase heat exchange coefficient. Upper tube sheet 40 and lower tube sheet 34 support the tubes 22 in the heat exchanger. Header 84 above tube sheet 40 and effluent chamber 86 below tube sheet 34 are provided for gases passing through the tube side of the exchanger, effluent chamber 86 being connected to gas outlet passage 64.

Plenum chambers 42 and 88 located below each of the catalyst baskets are connected to the shell side of the heat exchanger by, respectively, conduits 36 and 38. Conduits 36 and 38 are conveniently located around the axis of the reactor, but other arrangements may, of course, be employed.

As shown, header 84 is formed by the lower side of plenum chamber 42, the top side of tube sheet 40 and perforate annular section 82 which is spaced from inner shell 30 to allow for passage of gases.

Both first and second plenum chambers 42 and 88 are smaller in diameter than inner shell 30, thus providing annular passages therearound. Attached to each of the plenum chambers 42 and 88 are a plurality of heat exchange tubes 44 and 90, respectively, passing through the individual first and second catalyst beds 14 and 68. The first or lower catalyst bed 14 is supported by a grid 70 and peforated bottom plate 74, and annular side member 72 which together form the catalyst basket. The top of the first catalyst basket is formed by the bottom of the second plenum chamber 88. It is to be noted that the first catalyst basket is also of a smaller diameter than the inner shell 30, thus providing an annular passage 102 therearound.

The second catalyst basket is of similar construction to the first catalyst basket, but occupies the full space within the inner shell and thus has no annular side passage. Thus, catalyst bed 14 is supported on grid 98 and perforated bottom plate 100. Both catalyst baskets are provided with catalyst cover plates 62 and 96, respectively, and heat exchange tubes 44 and 90 are all provided with openings 58 and 92, respectively, at their upper ends above the catalyst cover plates. Chambers 66 and 94, respectively, above the catalyst beds, allow gases issuing from the respective heat exchange tubes to mix and pass downwardly through the beds.

Heat exchange with the catalyst beds by heat exchange tubes 44 and 90 is improved by the insertion of a dummy tube 46 in each of said tubes, thus increasing the velocity of gases passing therethrough.

Cold gas conduits 104 and 106 run directly up the center of the bottom of the reactor. These conduits may be coaxial, as shown at the bottom of the reactor, and/or hemispherical, as shown in the heat exchanger. Conduit 104 communicates with chamber 16 near the top thereof through opening 108, and conduit 106 communicates with chamber 16A at the same level. Separate valves (FIGURE 3) control gas flow through conduits 104 and 106.

Figure 2:
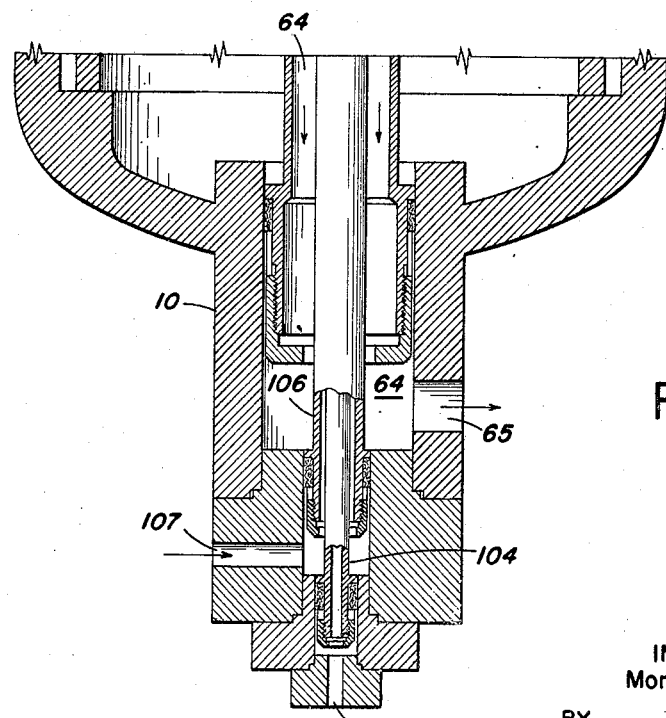
FIGURE 2 is a vertical cross section of the bottom portion of the reactor of FIGURE 1.

The bottom portion of the reactor is illustrated in FIGURE 2. Effluent gases passing through outlet conduit 64 pass out of the reactor through outlet 65. Cold gas enters inner conduit 104 through inlet 105, and cold gas enters coaxial conduit 106 through inlet 107. Of course, this is merely one of several possible arrangements that might occur to one skilled in the art.

Multiple thermocouples 60 and 61 (only two shown) pass through the top of the reactor and into the first and second catalyst beds, respectively. A control system responsive to any one of the multiple thermocouples in each bed may be provided to automatically control cold gas in conduits 104 and 106.

Figure 3:
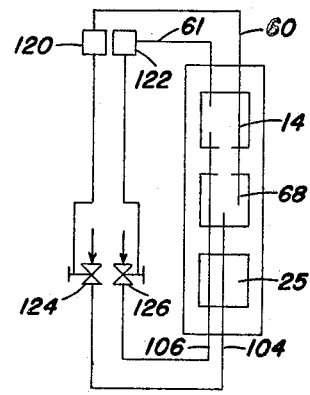
FIGURE 3 is a schematic diagram illustrating temperature control of the converter.

One method of temperature control of the individual catalyst beds is illustrated schematically in FIGURE 3. Thus, multiple thermocouple 61 has a series of sensing elements buried at different heights in upper catalyst bed 14, and the "hot spot" point is connected to suitable control means 122, which opens valve 126 when a predetermined temperature is exceeded, allowing cold gases to pass through line 106 and into chamber 16A, conduit 38 and catalyst bed 14. Similarly, multiple thermocouple 60 is buried at different heights in lower catalyst bed 68, its "hot spot" point is connected to control means 120, which responsive thereto operates valve 124 allowing cold gas to pass through line 104 and into bed 68 when required. It will be understood that control means 120, 122 may be either fully automatic or may merely indicate the temperature and require manual operation of valves 124, 126.

An additional feature of the invention, which markedly simplifies the construction of a converter according to the invention, is that the entire unit from the second catalyst bed upward may be assembled after the lower portions of the unit are all in place, and the two sections joined with but a single weld. Thus, the inner shell 30 may be provided in two pieces, the first piece extending from the bottom tube sheet 34 up to about the level of the perforated supporting plate 100 for the second catalyst basket. The various parts of the converter in the lower portion are assembled and installed and, the second or upper catalyst basket and the second piece of shell 30 are separately assembled and then merely welded to the lower portion.

In FIGURE 4 there is illustrated an alternative embodiment of the invention wherein chambers 16 and 16A of heat exchanger 25 are of unequal size due to different gas flow requirements in the catalyst beds. As shown in FIGURE 4, the heat exchanger 25 within inner shell 30 and insulation 30A is centered in outer shell 10 with annular passage 18 therebetween. Chambers 16 and 16A are divided unequally by dividing baffle 26 so that, as shown, chamber 16 has fewer tubes 22 (shown only in part) and less heat transfer surface than chamber 16A. Gas flowing through annular passage 18 and circular opening 24 (FIGURE 1) will flow into chambers 16 and 16A in the same proportion as these chambers are divided.

In operation, cold, mixed reactant gases are supplied through gas inlet 12, pass through chamber 20 and into annular passage 18 between outer shell 10 and inner shell 30. From annular passage 18 the gases pass into the shell side of the heat exchanger through peripheral opening 24 at the bottom of inner shell 30, where they are heated by effluent gases in the tube side. Dividing baffle 26 separates the gases into two sections 16 and 16A, baffles 76 and 78 insuring a serpentine-like flow of the gases passing upwardly through the heat exchanger.

Gases passing upwardly through section 16 flow into conduit 36 and into first plenum chamber 42; gases in section 16A are removed through conduit 38 into second plenum chamber 88.

Gases in the respective plenum chambers 42 and 88 pass upwardly through the respective heat exchange tubes 44 and 90 into chambers 66 and 94, and then pass downwardly through catalyst beds 14 and 68, where reaction takes place, through the respective screens and perforated supporting plates, and into the annular passages 102 and 80, to openings 82 in header 84. From header 84 gases pass through the tubes 22 of the heat exchanger, where they are cooled, into effluent chamber 86, and out of the reactor through gas outlet 64.

The temperature within each catalyst bed is controlled by supplying cold gases as needed through conduits 104 and 106, respectively, and thermocouples 60 and 61 are employed to monitor the temperature in each catalyst bed, as set forth hereinabove.

Figure 5:
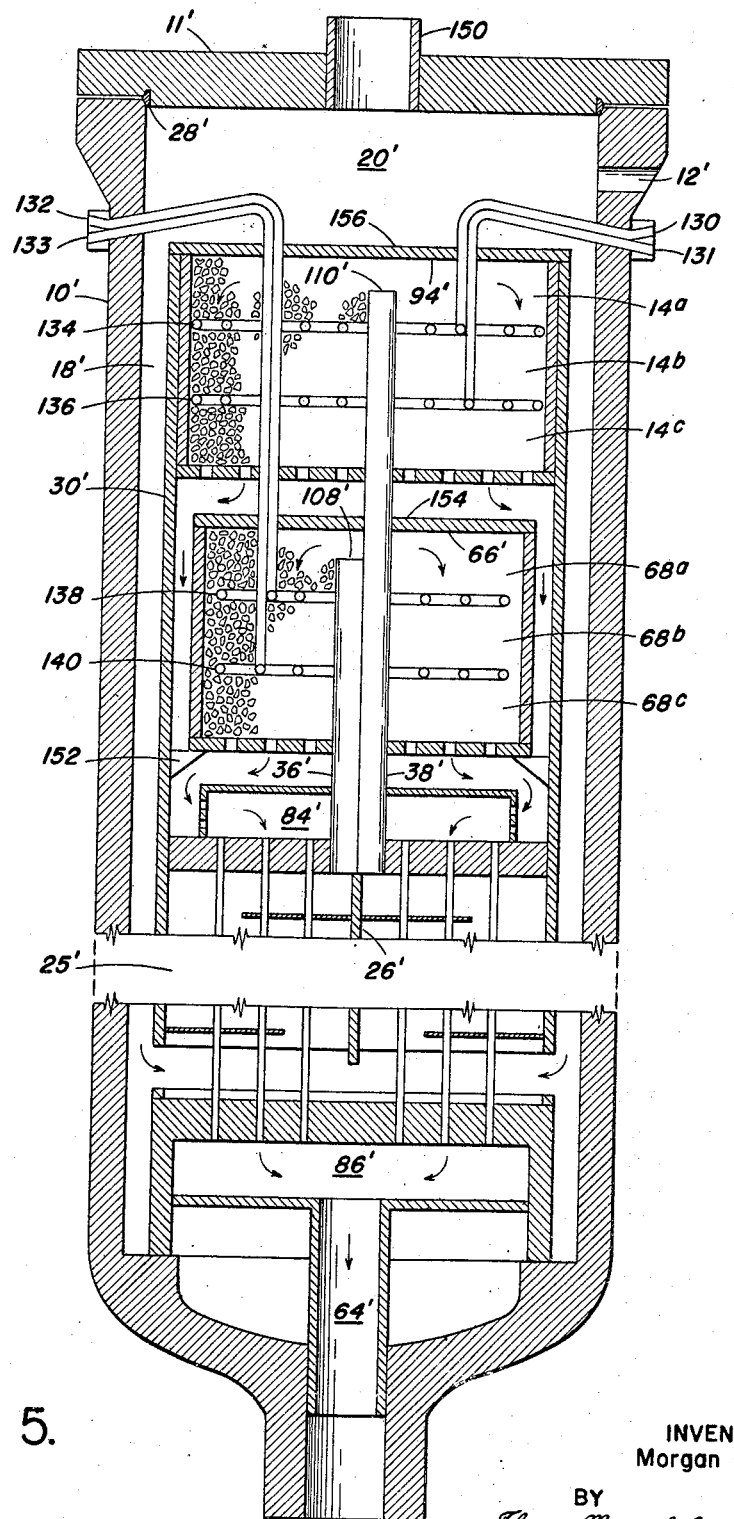
FIGURE 5 is a simplified, vertical cross section of a quench-type converter according to the invention.

In FIGURE 5 there is shown in simplified cross-section a quench-type converter adapted to the present invention. Parts having the same general placement or function as in FIGURE 1 are indicated by prime reference numerals. With reference to FIGURE 5, the outer shell 10', inner shell 30', heat exchanger 25', headers 84' and 86' and outlet conduit 64' are substantially as described in connection with FIGURE 1. Cold gas conduits 104, 106 are not necessary in this embodiment, though they may optionally be provided instead of the quench distributors shown at the top of each basket and described hereinbelow.

Neither of the catalyst baskets are provided with plenum chambers or heat exchange tubes buried within the beds. Rather, conduits 36' and 38' extend directly through the lower and upper catalyst beds, respectively, with openings 108', 110' located in chambers 66' and 94'. Gases from chambers 16 and 16a on the shell side of heat exchanger 25' are thus passed directly to points just above the respective catalyst beds. Plates 154 and 156 are provided to enclose chambers 66' and 94' and form the top of each catalyst basket, the latter plate also serving as the top of inner shell 30'.

Rather than having a single bed within each basket, a plurality of beds are provided. The upper catalyst basket thus has beds 14a, 14b and 14c, and the lower basket has beds 68a, 68b and 68c. Separating these beds are quench gas distributors 134, 136, commonly perforated pipe rings, in the upper basket and quench gas distributors 138, 140 in the lower basket. Distributors 134, 136 are each connected to a quench gas conduit 130 and 131, and distributors 138, 140 are connected to quench gas conduits 132 and 133. Temperature within the bed is thus directly controlled by providing cold quench gas to each bed within each basket as determined by thermocouples (not shown) buried therein. While only two quench gas conduits have been shown for each basket, it will be understood that with more catalyst beds in the basket, more conduits may be provided, thus giving a very close control over the reaction temperature.

Temperature of the gases entering the catalyst beds can be controlled either by providing additional quench gas conduits to chambers 66' and 94', or employing conduits 104 and 106 as illustrated in FIGURE 1. Suitable valves and control means (as in FIGURE 3) control the cold gas flow. In this case, each quench gas conduit is provided with a control valve.

In FIGURE 5, there is shown an additional inlet 150 for an electrical heater element (not shown) which is useful for bringing the gases and catalyst beds to operating temperature on start-up.

In this embodiment, it is also desirable to employ brackets 152 to support the lower catalyst basket, though other means may also be employed for this purpose.

Operation of the quench-type converter is substantially the same as described in connection with FIGURE 1. Gases enter chamber 20' through main gas inlet 12', pass down annular passage 18' and through the shell side of exchanger 25' and, because of baffle 26', are divided into two streams in conduits 36' and 38'. The gases pass upwardly through these conduits into chambers 66' and 94', and then downwardly through the respective catalyst beds for reaction therein, and then pass out of the beds, through the tube side of heat exchanger 25' and into outlet conduit 64'.

It is to be understood that various changes in the details, steps, materials, and arrangements of parts, described hereinabove for purposes of illustrating the invention, may be made by those skilled in the art, without departing from the scope of the appended claims. For example, three catalyst beds could be arranged above a single common heat exchanger with appropriate changes in the dividing baffle, cold gas inlets, conduits and the like. Also, in some installations it might be preferred to reverse the flow through the heat exchanger, i.e., passing incoming gas through the tube side and reacted gas through the shell side.

What is claimed is:
1. Apparatus for effecting catalytic, exothermic gaseous reactions which comprises:
   an outer shell;
   an inner shell mounted within said outer shell and spaced therefrom so as to leave an annular passage therebetween;
   a shell-and-tube type heat exchanger mounted in the bottom of said inner shell, said heat exchanger being in gas receiving communication at its lower end with said annular passage;
   first inlet means in said outer shell for feeding a first portion of mixed gases to be reacted into said annular passage between said inner and outer shells and thence through said heat exchanger;
   means associated with said heat exchanger for dividing said first portion of mixed gases into a plurality of gas streams;
   separate conduit means in gas receiving communication with each of said gas streams after passage thereof through said heat exchanger;
   a header mounted adjacent the top of said heat exchanger in gas delivering communication with said heat exchanger and adapted to pass gases therethrough in indirect heat exchange with said first portion of mixed gases; said header being spaced from said inner shell so as to leave an annular passage therebetween, said header being in gas receiving communication therewith;
   a plurality of catalyst baskets, each containing a catalyst bed, mounted one above the other above said heat exchanger and said header, the number of said baskets corresponding to the number of said gas streams;
   passage means for passing effluent gases from each of said baskets to said header;

a plenum chamber immediately below each of said catalyst baskets, each of said plenum chambers being in gas receiving communication with one of said conduit means;

a plurality of additional inlet means for passing cold, mixed gases to each of said gas streams prior to the point of entry into said catalyst basket;

a plurality of heat exchange tubes extending through each said catalyst bed, said tubes being at their lower end in gas receiving communication with the plenum chamber below said basket for receiving and passing said gases upwardly through said tubes in indirect heat exchange with said bed to the top of said bed for reaction therein during subsequent passage downwardly therethrough, reacted gases from each said catalyst bed passing into said passage means and thence into said header; and outlet means in gas receiving communication with said heat exchanger for receiving reacted gases passed in indirect heat exchange with said first portion of mixed gases and for removing said gases from said reactor.

2. Apparatus for effecting catalytic, exothermic gaseous reactions which comprises:

an outer shell;

an inner shell mounted within said outer shell and spaced therefrom so as to leave an annular passage therebetween;

a shell-and-tube type heat exchanger mounted in the bottom of said inner shell, the lower end of the shell side of said heat exchanger being in gas receiving communication with said annular passage around its periphery;

first inlet means in said outer shell for feeding a first portion of mixed gases to be reacted into said annular passage between said inner and outer shells and thence through the shell side of said heat exchanger;

baffle means dividing the shell side of said heat exchanger into two sections;

first conduit means in gas receiving communication with one of said sections and second conduit means in gas receiving communication with the other of said sections;

a header mounted immediately adjacent the top of said heat exchanger in gas delivering communication with the tube side of said heat exchanger, said header being spaced from said inner shell so as to leave an annular passage therebetween, said header being in gas receiving communication therewith;

a first catalyst basket containing a first catalyst bed mounted within said inner shell and spaced therefrom so as to leave an annular passage therebetween, said first catalyst basket being positioned above said heat exchanger and said header;

a second catalyst basket containing a second catalyst bed mounted within said inner shell and positioned above said first catalyst basket;

a first plenum chamber below said first catalyst basket in gas receiving communication with said first conduit means, said first chamber being spaced from said inner shell so as to provide an annular passage therebetween;

a second plenum chamber below said second catalyst basket in gas receiving communication with said second conduit means, said second chamber being spaced from said inner shell so as to provide an annular passage therebetween;

the annular passages between said inner shell and said second plenum chamber, said first catalyst basket, said first plenum chamber and said header forming a continuous annular passage;

second and third inlet means for passing cold, mixed gases to each of said sections of the shell side of said heat exchanger near the outlets to said conduits;

a plurality of heat exchange tubes extending through said first catalyst bed and a plurality of heat exchange tubes extending through said second catalyst bed, the tubes extending through each said bed being at their lower ends in gas receiving communication with, respectively, said first and second plenum chambers, for receiving and passing said gases upwardly through said tubes in indirect heat exchange with said beds to the tops of said beds for reaction therein during subsequent passage downwardly therethrough, reacted gases from said catalyst beds passing into said continuous annular passage and thence into said header; and outlet means in gas receiving communication with the tube side of said exchanger at the bottom thereof for receiving reacted gases from said heat exchanger where they pass in indirect heat exchange relation with gases from said first inlet means and for removing said reacted gases from said reactor.

3. The apparatus as defined in claim 2, wherein said second and third inlet means pass up through the center of said reactor and said heat exchanger.

4. The apparatus as defined in claim 2, and additionally comprising thermocouple means in each of said first and second catalyst beds, valve means controlling said second and third inlet means, and control means responsive to said thermocouple means for controlling said valve means.

5. The apparatus as defined in claim 2, wherein said first and second conduits between said plenum chambers and said heat exchanger are located about the axis of the reactor.

6. The apparatus as defined in claim 2, wherein said plurality of heat exchange tubes in each of the said catalyst beds are each provided with core tubes therein, whereby heat exchange between said catalyst bed and said heat exchange tubes is improved.

7. The apparatus as defined in claim 2, wherein said dividing baffle is constructed so as to divide said mixed gases proportionally to the gas flow capacity of each said catalyst bed.

8. Apparatus for effecting catalytic, exothermic gaseous reactions which comprises:

an outer shell;

an inner shell mounted within said outer shell and spaced therefrom so as to leave an annular passage therebetween;

a shell-and-tube type heat exchanger mounted in the bottom of said inner shell, said heat exchanger being in gas receiving communication at its lower end with said annular passage;

first inlet means in said outer shell for feeding a first portion of mixed gases to be reacted into said annular passage between said inner and outer shell and thence through said heat exchanger;

means associated with said heat exchanger for dividing said first portion of mixed gases into a plurality of gas streams;

separate conduit means in gas receiving communication with each of said gas streams after passage thereof through said heat exchanger;

a header mounted adjacent the top of said heat exchanger in gas delivering communication with said heat exchanger and adapted to pass gases therethrough in indirect heat exchange with said first portion of mixed gases; said header being spaced from said inner shell so as to leave an annular passage therebetween, said header being in gas receiving communication therewith;

a plurality of catalyst baskets, each containing a plurality of catalyst beds, said baskets mounted one above the other above said heat exchanger and said header, the number of said baskets corresponding to the number of said separate conduits, said conduits being adapted to pass one of said gas streams to the top of each said catalyst basket for reaction within said catalyst beds during subsequent passage downwardly therethrough;

passage means for passing effluent gases from each of said baskets to said header;

a plurality of additional inlet means for passing cold, mixed gases to each of said catalyst beds;

outlet means in gas receiving communication with said heat exchanger for receiving reacted gases passed in indirect heat exchange with said first portion of mixed gasses and for removing said gases from said reactor.

9. The apparatus as defined in claim 8, and additionally comprising control means responsive to the temperature in each said catalyst bed, said control means being operable to start the flow of cold mixed gases from any of said plurality of additional inlet means to a given catalyst bed when a predetermined temperature therein is reached.

10. In an apparatus for carrying out high temperature exothermic gaseous reactions, the apparatus including a reactor vessel, an inlet line for introducing unreacted gas to the vessel and an outlet line for discharging reacted gas from the vessel, the improvement comprising:

(a) a heat exchanger means within the vessel, one side thereof being in fluid flow communication with the inlet line, and the other with the outlet line;

(b) means in said vessel for dividing said unreacted gas into separate and distinct streams after passing through the one side of said heat exchanger means;

(c) a plurality of catalyst beds mounted in said vessel;

(d) means for communicating each one of said distinct streams with only one of said catalyst beds to cause parallel flow of said unreacted gases through said beds for reaction; and (e) means for comingling the gases after reaction for passage through the other side of the heat exchanger means in an indirect heat transfer relationship with unreacted gases and then to the outlet line.

References Cited

UNITED STATES PATENTS

| | | | |
|---|---|---|---|
| Re. 19,243 | 7/1934 | Richardson | 23—289 X |
| 2,512,586 | 6/1950 | Stengel | 23—288.9 |
| 3,041,151 | 6/1962 | Christensen | 23—289 |
| 2,315,525 | 4/1943 | Hulsberg | 23—288 |

MORRIS O. WOLK, Primary Examiner

M. D. BURNS, Assistant Examiner

U.S. Cl. X.R.

23—288